US010749331B2

(12) United States Patent
Lee et al.

(10) Patent No.: US 10,749,331 B2
(45) Date of Patent: Aug. 18, 2020

(54) SYSTEM AND METHOD FOR LEAKAGE CURRENT PROTECTION

(71) Applicant: AVer Information Inc., New Taipei (TW)

(72) Inventors: Te-Hua Lee, New Taipei (TW); Wen-Ming Hsieh, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 314 days.

(21) Appl. No.: 15/883,048

(22) Filed: Jan. 29, 2018

(65) Prior Publication Data

US 2018/0316177 A1   Nov. 1, 2018

(30) Foreign Application Priority Data

Apr. 28, 2017   (TW) ................. 106114338 A

(51) Int. Cl.
*H02H 3/00* (2006.01)
*H02H 3/02* (2006.01)
*H02H 3/33* (2006.01)

(52) U.S. Cl.
CPC .............. *H02H 3/02* (2013.01); *H02H 3/335* (2013.01)

(58) Field of Classification Search
None
See application file for complete search history.

(56) References Cited

U.S. PATENT DOCUMENTS

2010/0194354 A1   8/2010   Gotou et al.
2011/0063768 A1*  3/2011   Sexton ............... H02H 3/10
                                              361/79

FOREIGN PATENT DOCUMENTS

JP   2012-125053 A   6/2012
TW           538570 B   6/2003
TW      201328094 A   7/2013
TW      201607205 A   2/2016

* cited by examiner

*Primary Examiner* — Stephen W Jackson
(74) *Attorney, Agent, or Firm* — CKC & Partners Co., LLC

(57) ABSTRACT

The present invention discloses a system and method for leakage current protection. The leakage current protection method comprises the following steps: using a first control signal to control a first relay to be short circuit so as to generate a leakage current; a leakage current sensor generates an AC signal when the leakage current sensor detects the leakage current; using a leakage current signal processor to convert the AC signal to a DC signal; and when a latch circuit receives the DC signal, the latch circuit uses a second control signal to disconnect a second relay which is connected to electrical appliances which are needed to protect.

10 Claims, 2 Drawing Sheets

SYSTEM AND METHOD FOR LEAKAGE CURRENT PROTECTION

RELATED APPLICATIONS

This application claims priority to Taiwan Application Serial Number 106114338, filed Apr. 28, 2017, which is herein incorporated by reference.

BACKGROUND

Field of Invention

The present invention relates to a system and method for leakage current protection.

Description of Related Art

In conventional technology, if a leakage current situation is detected, a current protector disconnects all power supply loops through mechanical AC coils, and the power supply of a detection board of the current protector is also disconnected. Generally, a commercial available leakage current protector has the mechanical AC coils, and there are no follow-ups after if power supply is disconnected. When the power supply is recovers, the mechanical device needs to be started manually.

SUMMARY

The present invention provides a leakage current protection system. The micro-control unit of the leakage current protection system starts the self-detection procedure after executing the boot program. The micro-control unit uses a test leakage current to examine whether the self-detection procedure is normally executed or not. If the results are as expected, the power recovers automatically. If the results are abnormal, the alarms are issued and the power is stopped to provide. In fact, if there is a leakage current, the micro-control unit will disconnect the relay which is connected to electrical appliances, and the micro-control unit also controls the alarm unit to issue an alarm sound or controls the communication unit to send an alarm message to the remote server, so as to ensure the safety of users and protect the electrical appliances efficiently. In addition, the micro-control unit of the present invention further uses the communication unit to receive the remote start signal, the external inspectors can unlock the latch circuit through videos or confirmation messages remotely to conduct the relay to let the electrical appliance can operate. Therefore, even if there are no staffs at the scene, the remote control can be also implemented, so as to let the leakage current protection system can have the different kinds of operation way.

An aspect of the disclosure is to provide a leakage current protection system, which comprises a micro-control unit, a first relay, a leakage current sensor, a leakage current signal processor, a second relay, and a latch circuit. The first relay is connected to the micro-control unit. The micro-control unit uses a first control signal to control the first relay to be short circuit so as to generate a leakage current. The leakage sensor generates an AC signal if the leakage current is detected. The leakage current signal processor is connected to the leakage current sensor, and the leakage current signal processor converts the AC signal to a DC signal. The second relay is connected to the micro-control unit. The latch circuit is connected to the leakage current signal processor, the micro-control unit, and the second relay. The latch circuit uses a second control signal to disconnect the second relay when the latch circuit receives the DC signal, and the second relay is connected to electrical appliances which are needed to protect.

In one embodiment of the present invention, the micro-control unit uses the first control signal to disconnect the first relay if the micro-control unit determines that the leakage current is a test leakage current generated by a self-detection procedure. The micro-control unit sends a third control signal to unlock the latch circuit, and the micro-control unit uses the second control signal to make the second relay be conducted.

In one embodiment of the present invention, the leakage current protection system further comprises an alarm unit. The alarm unit is connected to the micro-control unit. When the latch circuit uses the second control signal to disconnect the second relay, the micro-control unit controls the alarm unit to issue an alarm sound if the micro-control unit determines the self-detection procedure is not being executed.

In one embodiment of the present invention, the leakage current protection system further comprises a communication unit. The communication unit is connected to micro-control unit. When the latch circuit uses the second control signal to disconnect the second relay, the micro-control unit controls the communication unit to send an alarm message if the micro-control unit determines the self-detection procedure is not being executed.

In one embodiment of the present invention, the micro-control unit receives a remote start signal of a remote server through the communication unit. If the micro-control unit determines that the remote start signal is received, the micro control unit sends the third control signal to unlock the latch circuit.

An aspect of the disclosure is to provide a leakage current protection method, and the method comprises the following steps: using a first control signal to control a first relay to be short circuit so as to generate a leakage current; generating an AC signal through a leakage sensor if the leakage sensor detects the leakage current; using a leakage current signal processor to convert the AC signal to a DC signal; and using a second control signal to disconnect a second relay through a latch circuit when the latch circuit receives the DC signal, and the second relay is connected to electrical appliances which are needed to protect.

In one embodiment of the present invention, the method further comprises the following steps: using the first control signal to disconnect the first relay if the leakage current is determined as a test leakage current generated by a self-detection procedure; using a third control signal to unlock the latch circuit; and using the second control signal to make the second relay be conducted.

In one embodiment of the present invention, the method further comprises the following step: using an alarm unit to issue an alarm sound if determining the self-detection procedure is not being executed when the latch circuit uses the second control signal to disconnect the second relay.

In one embodiment of the present invention, the method further comprises the following step: using a communication unit to send an alarm message if determining the self-detection procedure is not being executed when the latch circuit uses the second control signal to disconnect the second relay.

In one embodiment of the present invention, the method further comprises the following steps: receiving a remote start signal of a remote server through the communication unit; and sending the third control signal to unlock the latch circuit if determining the remote start signal is received.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
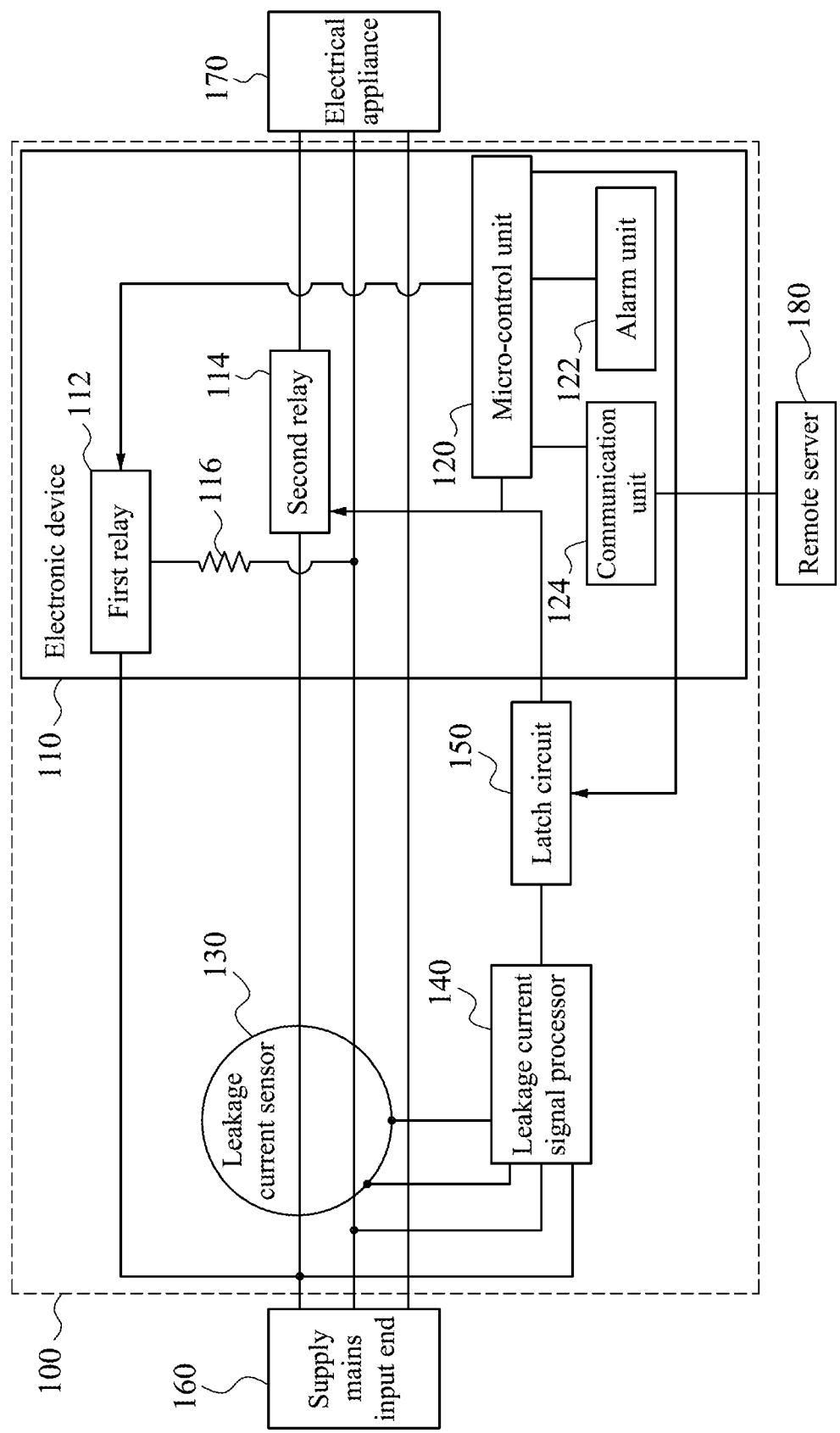
FIG. 1 is a block diagram of the leakage current protection system according to the first embodiment of the present invention.

Reference will now be made in detail to the present embodiments of the invention, examples of which are illustrated in the accompanying drawings. Wherever possible, the same reference numbers are used in the drawings and the description to refer to the same or like parts.

The present invention provides a leakage current protection system. FIG. 1 is a block diagram of the leakage current protection system according to the first embodiment of the present invention. The leakage current protection system 100 comprises an electronic device 110, a leakage current sensor 130, a leakage current signal processor 140, and a latch circuit 150. The electronic device 110 comprises a first relay 112, a second relay 114, a resistance 116, a micro-control unit (MCU) 120, an alarm unit 122, and a communication unit 124. The first relay 112 and the second relay 114 are connected to the micro-control unit 120. The leakage current signal processor 140 is connected to the leakage current sensor 130. The latch circuit 150 is connected to the leakage current signal processor 140, micro-control unit 120, and the second relay 114. In addition, a supply mains input end 160 provides power to the leakage current protection system 100 and an electrical appliance 170. The electrical appliance 170 can be one electrical product. Or, the electrical appliance 170 can be parallel combination of a plurality of electrical products. The electrical device 110 can be a charge cart.

Figure 2:
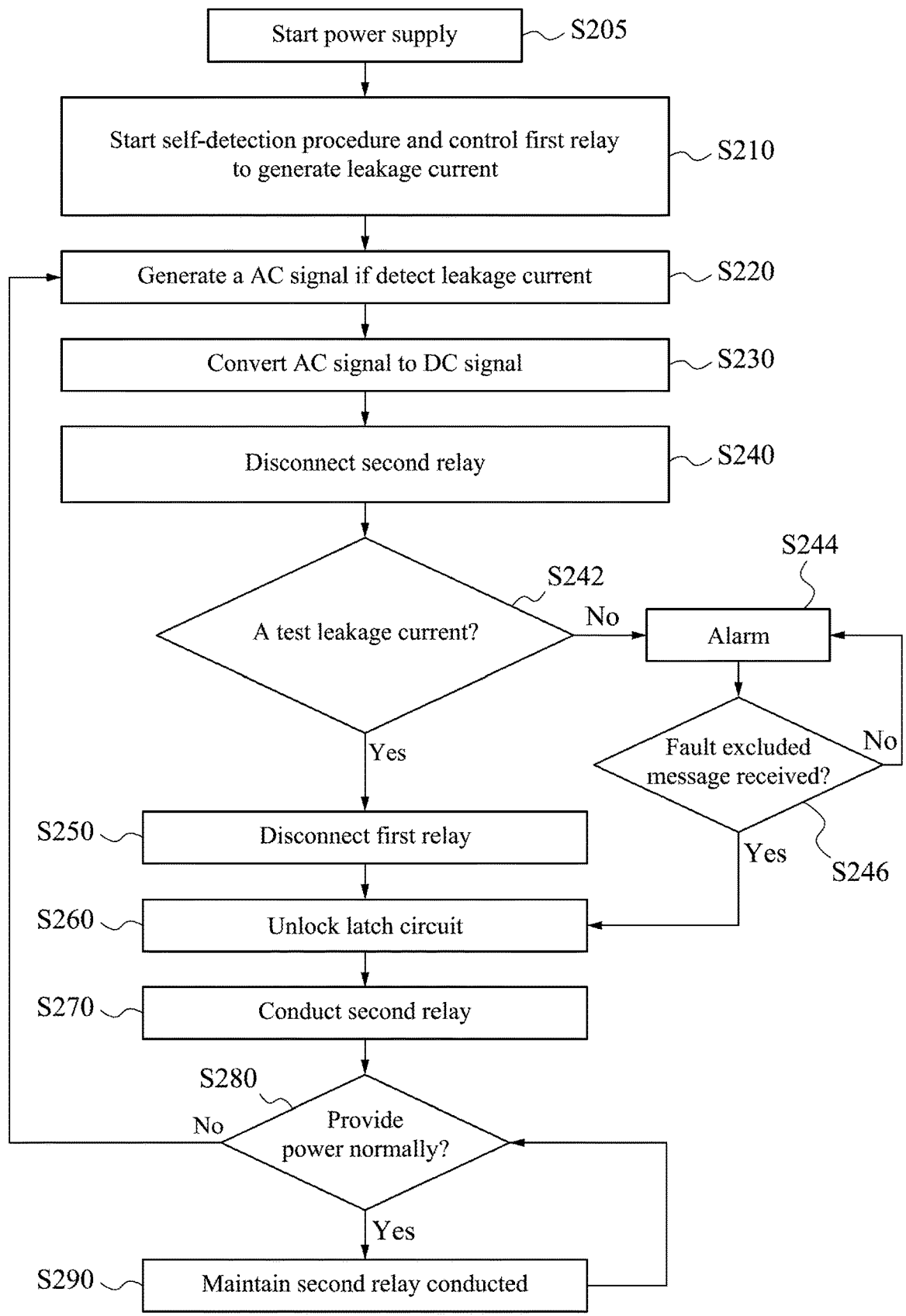
FIG. 2 is a flowchart of the leakage current protection method according to the first embodiment of the present invention.

FIG. 2 is a flowchart of the leakage current protection method according to the first embodiment of the present invention. Firstly, start the power supply (Step S205). After the supply mains input end 160 provides electrical power to the leakage current protection system 100, the micro-control unit 120 is enabled. The micro-control unit 120 starts a self-detection procedure. The micro-control unit 120 uses a first control signal to control the first relay 120 to be short circuit. Voltages of the conducted first relay 112 and the resistance 116 are not balanced, so as to generate a leakage current (Step S210). When the leakage current is detected by the leakage current sensor 130, the leakage current sensor 130 generates an AC signal (Step S220). The leakage current sensor 130 is an electromagnetic coil. If the leakage current is detected, the AC signal is generated because of an electromagnetic induction.

Next, the leakage current signal processor 140 converts the AC signal outputted by the leakage current sensor 130 to a DC signal (Step S230). The leakage current signal processor 140 has a filtering function, and the leakage current signal processor 140 can convert the AC signal to a DC signal. Next, when the latch circuit 150 receives the DC signal, the latch circuit 150 uses a second control signal to disconnect the second relay 114 (Step S240). The second relay 114 is connected to electrical appliances which are needed to protect. The latch circuit 150 sends the second control signal in order to disconnect the second relay 114. Since the micro-control unit 120 is connected to the latch circuit 150, the micro-control unit 120 receives the second control signal sent by the latch circuit 150. At this time, the micro control unit 120 has previously started a self-detection procedure, accordingly, the micro-control unit 120 can determine that the currently leakage current is merely a test leakage current generated from the self-detection procedure.

If the determination of Step S242 is Yes, the micro-control unit 120 uses the first control signal to disconnect the first relay 112 (Step S250). Next, the micro-control unit 120 sends a third control signal to unlock the latch circuit 150 (Step S260). After the Step S240, the latch circuit 150 is latched forcedly. Until the micro-control 120 sends the third control signal to unlock the latch circuit 150 at Step S260 or pull out the power plug and insert it again, the latch circuit 150 will unlock. Next, the micro-control unit 120 uses the second control signal to make the second relay 114 be conducted (Step S270). The second relay 114 is connected to the electrical appliance 170 which are needed to protect. Namely, after the Step S270, since the second relay 114 is conducted again, the supply mains input end 160 is recovered to provide power to the electrical appliance 170.

The alarm unit 122 of FIG. 1 is connected to micro-control unit 120, and the alarm unit can be a buzzer. When the latch circuit 150 uses the second control signal to disconnect the second relay 114, if the determination of Step S242 is No, namely, if the micro-control unit 120 determines the self-detection procedure is not being executed, the micro-control unit 120 controls the alarm unit 122 to issue an alarm sound (Step S244). For example, the buzzer is used to issue an alarm sound in order to remind nearby users that there are leakage currents and users should pay attention to safety.

The alarm of the Step S244 can be another representing way. The communication unit 124 of FIG. 1 is connected to micro-control unit 120, and the communication unit 124 can be a communication network interface. When the latch circuit 150 uses the second control signal to disconnect the second relay 114, if the micro-control unit 120 determines the self-detection procedure is not being executed, the micro-control unit 120 controls the communication unit 124 to send an alarm message to a remote server (Step S244). Accordingly, external inspectors can know that there are abnormal leakage currents at present and suspends to provide power temporarily until the abnormal situation is excluded, so as to ensure the safety of users and protect the electrical appliances. In addition, a cloud storage space of the remote server 180 also stores the leakage current event.

Next, the Step S246 determines that a message of "the fault is excluded" is received or not. After the leakage current situation is excluded, the micro-control unit 120 can receive a remote start signal of the remote server 180 through the communication unit 124 and regard the remote start signal as a message of "the fault is excluded." For example, if the leakage current situation is excluded or an error is confirmed, the remote server 180 sends the remote start signal to the communication unit 124 in order to make the micro-control unit 120 unlock the latch circuit 150. When the micro-control unit 120 determines that the remote start signal is received, the micro-control unit 120 knows that the fault is excluded. The micro-control unit 120 sends the third control signal to unlock the latch circuit 150 (Step S260).

After Step S270, the micro-control unit 120 continually determines that whether the power system provides power normally or not (Step 280). If the determination of Step S280 is yes, the second relay 114 is maintained as a conducted status (Step S290). If the power system provides power abnormally, namely, the determination of Step S280 is no, the method is returned to Step S220 to execute the procedure of the leakage current is detected by the leakage current sensor 130.

The present invention provides a leakage current protection system. The micro-control unit of the leakage current protection system starts the self-detection procedure after executing the boot program. The micro-control unit uses a test leakage current to examine whether the self-detection procedure is normally executed or not. In fact, if there is a leakage current, the micro-control unit will disconnect the relay which is connected to electrical appliances, and the micro-control unit also controls the alarm unit to issue an alarm sound or controls the communication unit to send an alarm message to the remote server, so as to ensure the safety of users and protect the electrical appliances. In addition, the micro-control unit of the present invention further uses the communication unit to receive the remote start signal, if there are no security concerns, the external inspectors can unlock the latch circuit remotely to conduct the relay to let the electrical appliance can operate, namely, the leakage current protection system can have the different kinds of operation way.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A leakage current protection system, comprising:
   a micro-control unit;
   a first relay, connected to the micro-control unit, wherein the micro-control unit uses a first control signal to control the first relay to be short circuit so as to generate a leakage current;
   a leakage current sensor, wherein the leakage sensor generates an AC signal if the leakage current is detected;
   a leakage current signal processor, connected to the leakage current sensor, wherein the leakage current signal processor converts the AC signal to a DC signal;
   a second relay, connected to the micro-control unit; and
   a latch circuit, connected to the leakage current signal processor, the micro-control unit, and the second relay, wherein the latch circuit uses a second control signal to disconnect the second relay when the latch circuit receives the DC signal, and the second relay is connected to electrical appliances which are needed to protect;
   wherein if the micro-control unit determines that a remote start signal is received, the micro control unit sends a third control signal to unlock the latch circuit.

2. The leakage current protection system of claim 1, wherein the micro-control unit uses the first control signal to disconnect the first relay if the micro-control unit determines that the leakage current is a test leakage current generated by a self-detection procedure, the micro-control unit sends the third control signal to unlock the latch circuit, and the micro-control unit uses the second control signal to make the second relay be conducted.

3. The leakage current protection system of claim 2, further comprising:
   an alarm unit, connected to the micro-control unit, when the latch circuit uses the second control signal to disconnect the second relay, the micro-control unit controls the alarm unit to issue an alarm sound if the micro-control unit determines the self-detection procedure is not being executed.

4. The leakage current protection system of claim 2, further comprising:
   a communication unit, connected to the micro-control unit, when the latch circuit uses the second control signal to disconnect the second relay, the micro-control unit controls the communication unit to send an alarm message if the micro-control unit determines the self-detection procedure is not being executed.

5. The leakage current protection system of claim 4, wherein the micro-control unit receives the remote start signal of a remote server through the communication unit.

6. A leakage current protection method, comprising:
   using a first control signal to control a first relay to be short circuit so as to generate a leakage current;
   generating an AC signal through a leakage sensor if the leakage sensor detects the leakage current;
   using a leakage current signal processor to convert the AC signal to a DC signal;
   using a second control signal to disconnect a second relay through a latch circuit when the latch circuit receives the DC signal, and the second relay is connected to electrical appliances which are needed to protect; and
   sending a third control signal to unlock the latch circuit if determining a remote start signal is received.

7. The leakage current protection method of claim 6, further comprising:
   using the first control signal to disconnect the first relay if the leakage current is determined as a test leakage current generated by a self-detection procedure;
   using the third control signal to unlock the latch circuit; and
   using the second control signal to make the second relay be conducted.

8. The leakage current protection method of claim 7, further comprising:
   using an alarm unit to issue an alarm sound if determining the self-detection procedure is not being executed when the latch circuit uses the second control signal to disconnect the second relay.

9. The leakage current protection method of claim 7, further comprising:
   using a communication unit to send an alarm message if determining the self-detection procedure is not being executed when the latch circuit uses the second control signal to disconnect the second relay.

10. The leakage current protection method of claim 9, further comprising:
    receiving the remote start signal of a remote server through the communication unit.

* * * * *